United States Patent Office 2,994,684
Patented Aug. 1, 1961

---

2,994,684
METHOD OF COPOLYMERIZING CYCLIC PHENYLSILOXANES
Oscar K. Johannson, Midland, Mich., assignor to The Dow Corning Corporation, Midland, Mich., a corporation of Michigan
No Drawing. Filed May 22, 1959, Ser. No. 814,968
1 Claim. (Cl. 260—46.5)

This invention relates to the alkaline copolymerization of hexaphenylcyclotrisiloxane with phenylmethylsiloxane cyclics. This application is a continuation-in-part of applicant's copending application Serial No. 594,107, filed June 27, 1956, which is in turn a continuation-in-part of applicant's application Serial No. 520,923, filed July 8, 1955, now U.S. Patent 2,868,766.

It has long been known in the organosilicon art that cyclic diorganosiloxanes could be polymerized to high polymers by heating them with alkaline catalysts such as alkali metal hydroxides or the corresponding siloxane salts. This method gives certain polymeric siloxanes which are suitable for the production of siloxane elastomers and has become the primary commercial method for making such polymers.

In the art it is stated that any cyclic organosiloxane can be polymerized with alkali. No distinction has been made between the use of cyclic trisiloxanes and cyclic tetrasiloxanes or higher cyclics. However, during the alkaline polymerization of any cyclic diorganosiloxane two reactions are occurring simultaneously. One is the breaking of the siloxane ring to form high polymers and the other is the degradation of the high polymers to form cyclics. The polymerization and degradation processes occur at different rates and consequently the resulting product represents an equilibrium between the two processes. The equilibrium may be represented by the equation:

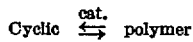

$$\text{Cyclic} \underset{}{\overset{\text{cat.}}{\rightleftarrows}} \text{polymer}$$

The percent of cyclics at the point of equilibrium varies greatly depending upon the size of the groups attached to the silicon atoms of the siloxane being polymerized. In the case of the tetramer of diphenyl-siloxane, for example, the percent of cyclics at equilibrium is almost 100 percent. Consequently it has heretofore been impossible to produce high polymeric siloxane copolymers containing diphenylsiloxane when the latter was present in the copolymer in a proportion greater than 25 mol percent. This has been especially true for diphenysiloxane-phenylmethylsiloxane copolymers.

The applicant has found, however, that this difficulty can be avoided by carrying out the copolymerization in accordance with the method of this invention.

It is the primary object of this invention to provide a method of preparing highly polymerized copolymers of phenylmethylsiloxane units and diphenylsiloxane units in good yields under economically feasible conditions.

Another object is to provide a method for the preparation of novel copolymeric siloxanes suitable for use as free films. Other objects and advantages will be apparent from the following description.

This invention relates to a method of preparing high polymeric copolymers which comprises heating a mixture of from 40 to 90 mol percent hexaphenylcyclotrisiloxane, from 10 to 60 mol percent of a cyclic phenylmethylsiloxane and from 0 to 10 mol percent of a cyclic siloxane of the unit formula $C_6H_5RSiO$ in which each R is an aliphatic hydrocarbon radical of 2 carbon atoms, i.e. $(C_6H_5)(C_2H_5)SiO$ or $(C_6H_5)(C_2H_3)SiO$, in the presence of an alkaline catalyst, such as alkali metal hydroxides, quaternary ammonium hydroxides and organosilicon salts of said hydroxides, at a temperature and for a time sufficient to cause copolymerization to the desired polymer without causing appreciable degradation of the polymer so formed to cyclosiloxanes.

It is essential in preparing the polymers of this invention that the cyclic trimer of diphenylsiloxane be employed. Repeated attempts to prepare copolymers using the cyclic tetramer of diphenylsiloxane invariably resulted is viscous, sticky, unusable masses. They were evidently of low molecular weight and were completely unsuited for the formation of the free films of this invention. The size of the phenylmethyl, phenylethyl or phenylvinylsiloxane cyclics used is not critical. Thus one may employ either the cyclic trimers of these latter siloxanes or the cyclic tetramers or higher cyclics.

The crux of the method of this invention is to maintain the conditions of temperature and time so that the defined cyclotrisiloxane will form high copolymers with the other defined cyclic siloxanes at a rate appreciably greater than the degradation of these high polymers to cyclic siloxanes. By applying the conditions which will cause this phenomena one can obtain high polymeric diphenylsiloxane-phenylmethylsiloxane copolymers in excellent yields. (It should be understood that the cyclics formed by degradation of the high polymer are primarily cyclotetrasiloxanes.) The optimum temperature and time for producing any particular copolymer must be determined for each system depending on the starting cyclics and on the catalyst. If the optimum polymerization temperature with a given catalyst for a very reactive siloxane is grossly exceeded, the rate of depolymerization will be so great that the siloxane may be polymerized and degraded all in a matter of a few minutes. Furthermore, if the optimum time at any particular temperature is grossly exceeded, the polymer formed will be degraded to cyclics.

In general the copolymerization of the cyclosiloxanes of this invention can be carried out at temperatures ranging from 30° C. to 250° C. or higher for times varying from 5 minutes to 3 days. It is preferable that such copolymerization is done in the absence of a solvent. In such a case the temperature of the reaction mixture of cyclic siloxanes must be above 175° C., preferably 200° C. or higher, to insure a liquid system. If desired, however, the copolymerization can be carried out in solvent solution. In solution in a solvent such as diphenylether the cyclic siloxane starting materials can be copolymerized at essentially room temperature with a very active catalyst. In general, the polymerization temperature should be less than 300° C.

The most critical factor which affects the rate of the reaction is the alkalinity of the catalyst. For any given cyclic siloxane more rapid polymerization takes place under given conditions of temperature with a more alkaline catalyst. Thus one can control the rate of polymerization by choosing a catalyst of the desired alkalinity. For example, a polymerization which will proceed in 5 minutes with potassium hydroxide may require several hours or days with lithium hydroxide. It can be seen, therefore, that the polymerizations of this invention can be readily controlled by choosing the proper temperature and catalyst combinations. Thus, the higher the temperature and the stronger the catalyst the more rapid will be the polymerization. The lower the temperature and the weaker the catalyst the longer the polymerization will take.

The amount of catalyst employed is not critical and may range from 1 alkali metal atom or quaternary nitrogen atom per 100 silicon atoms to 1 alkali metal atom or quaternary nitrogen atom per 200,000 silicon atoms. Although polymerizations can be obtained with even less alkali, the process is not practical since it requires only extremely small amounts of acidic impurities to destroy the catalyst.

The catalysts which may be employed in the method of this invention include any of the so-called strong alkalies such as alkali metal hydroxides, quaternary ammonium hydroxides and the organosilicon salts of such hydroxides. These salts are of the general formula

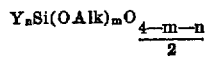

in which each Y is any alkali stable organic radical such as monovalent hydrocarbon radical and (Alk) is any alkali metal or quaternary ammonium ion, $n$ has a value from 1 to 3 inclusive and $m$ has an average value from .1 to 3. Specific examples of the catalysts of this invention are the hydroxides of potassium, sodium and lithium, $Me_3SiOK$, $PhMe_2SiOLi$,

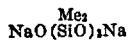

$Et_3SiONa$, $Ph_3SiOK$, β-hydroxyethyltrimethylammonium hydroxide, benzyltrimethylammonium hydroxide, didodecyldimethylammonium hydroxide, $Me_3SiONMe_4$,

and the benzyltrimethylammonium salt of dimethylsilanediol.

The method of this invention makes possible the preparation of copolymers of diphenylsiloxane and phenylmethylsiloxane as is fully described in applicant's U.S. Patent 2,868,766. These copolymers have unique properties in that they can be cast into free films and have extremely good thermal stability.

The following examples are illustrative only and should not be construed as limiting the invention which is properly delineated in the appended claims.

In this specification the designations Me, Et and Ph are employed for the methyl, ethyl and phenyl radicals respectively.

*Example 1*

A mixture of 26.02 g. of hexaphenylcyclotrisiloxane and 5.96 g. of sym-triphenyltrimethylcyclotrisiloxane was heated at 210° C. until it was fluid and then .0047 g. of the salt $Ph_2MeSiOLi$ was added. Heating was continued at 210° C. for 5 hours. A solid, opaque mass was obtained which was a copolymer of 75 mol percent $Ph_2SiO$ and 25 mol percent PhMeSiO. This copolymer was dissolved in hot diphenylether and the solution was poured into an aluminum dish and the solvent was removed in an oven. The solvent thereupon evaporated leaving a flexible film which did not dissolve in toluene.

*Example 2*

A mixture of 28.1 g. of hexaphenylcyclotrisiloxane and 19.1 g. of sym-triphenyltrimethylcyclotrisiloxane was melted and .001 g. of $Me_3SiOK$ was added. The mixture was heated at 200° C. for 24 hours to give a solid copolymer having the composition 50 mol percent $Ph_2SiO$ and 50 mol percent PhMeSiO. The copolymer was dissolved in hot chlorobenzene and the catalyst was neutralized by adding trimethylchlorosilane. The solution was poured onto a hot aluminum plate and the solvent was evaporated at 80° C. leaving a flexible, tough film. This film was insoluble in toluene. It did not soften after 18 hours at 300° C. during which time it lost 15% of its weight. The film softened slightly when heated to 400° C.

*Example 3*

A mixture of 3.3 g. of sym-triphenyltrimethylcyclotrisiloxane and 27.6 g. of hexaphenylcyclotrisiloxane was melted and .0044 g. of the salt $Ph_2MeSiOLi$ was added. The mixture was heated at 210° C. for 20 hours. The resulting copolymer of 85 mol percent $Ph_2SiO$ and 15 mol percent PhMeSiO was dissolved in hot diphenylether to give a 5 percent solution and was cast onto an aluminum plate as in Example 1 to give a flexible film. Another portion of the solution was employed to impregnate glass cloth. After the solvent was removed the impregnated cloth was flexible and useful as an electrical tape.

*Example 4*

Employing the method of Example 1 a copolymer was prepared from a mixture of 14 g. of hexaphenylcyclotrisiloxane, 8.7 g. of sym-triphenyltrimethylcyclotrisiloxane and 1.1 g. of sym-tetravinyltetraphenylcyclotetrasiloxane using .0038 g. of $Ph_2MeSiOLi$ as a catalyst. The resulting copolymer was soluble in toluene and formed a clear, tough, flexible film when cast from that solvent. It was composed of 50 mol percent $Ph_2SiO$, 45 mol percent PhMeSiO and 5 mol percent PhViSiO.

*Example 5*

When a mixture of 1.3 g. of sym-tetraphenyltetraethylcyclotetrasiloxane and 0.4 g. of sym-tetraphenyltetravinylcyclotetrasiloxane is substituted for the 1.1 g. of sym-tetraphenyltetravinylcyclotetrasiloxane in the copolymer preparation shown in Example 4, the resulting copolymer composed of approximately 48.5 mol percent $Ph_2SiO$, 43.7 mol percent PhMeSiO, 6.0 mol percent PhEtSiO and 1.8 mol percent PhViSiO is soluble in toluene and forms a clear, tough flexible film when cast from that solvent.

*Example 6*

When any of $KO(Me_2SiO)_2K$, NaOH or KOH are substituted in Example 2 for the $Me_3SiOK$, similar tough, flexible free films result.

*Example 7*

Equivalent results are obtained when either benzyltrimethylammonium hydroxide or the benzyltrimethylammonium salt of methylsilanetriol is substituted in Example 2 for the $Me_3SiOK$ in an amount equal to one nitrogen atom per 5000 silicon atoms.

That which is claimed is:

The method of preparing high polymeric copolymers which comprises heating a mixture of from 40 to 90 mol percent hexaphenylcyclotrisiloxane, from 10 to 60 mol percent of a cyclic phenylmethylsiloxane and from 0 to 10 mol percent of a cyclic siloxane of the unit formula $C_6H_5RSiO$ in which each R is an aliphatic hydrocarbon radical of 2 carbon atoms, in the presence of an alkaline catalyst selected from the group consisting of lithium hydroxide, sodium hydroxide, potassium hydroxide, quaternary ammonium hydroxides and organosilicon salts of said hydroxides at a temperature and for a time sufficient to cause copolymerization to the desired polymer without causing appreciable degradation of the polymer so formed to cyclosiloxanes.

References Cited in the file of this patent

UNITED STATES PATENTS

| | | |
|---|---|---|
| 2,490,357 | Hyde | Dec. 6, 1949 |
| 2,737,506 | Hurd et al. | Mar. 6, 1956 |